United States Patent
Wakayama et al.

[19]

[11] Patent Number: 5,836,229
[45] Date of Patent: Nov. 17, 1998

[54] GLASS SCRIBING DISC

[75] Inventors: Haruo Wakayama; Yasuhiro Chiyo, both of Settsu, Japan

[73] Assignee: Mitsuboshi Diamond Industrial Co., ltd., Osaka, Japan

[21] Appl. No.: 877,808

[22] Filed: Jun. 18, 1997

Related U.S. Application Data

[63] Continuation of Ser. No. 611,192, Mar. 5, 1996, abandoned.

[30]     Foreign Application Priority Data

Nov. 6, 1995 [JP] Japan .................................. 7-287175

[51] Int. Cl.$^6$ ............................. B26D 3/08; C03B 33/027
[52] U.S. Cl. ................................. 83/886; 83/676; 30/319; 30/355; 225/96; 76/115
[58] Field of Search ............................ 83/676, 884, 886; 30/306, 319, 355, 365, 307; 225/2, 96, 94; 76/115

[56]                References Cited

U.S. PATENT DOCUMENTS

| 537,803 | 4/1895 | Deckert | 30/319 X |
|---|---|---|---|
| 648,791 | 5/1900 | Raynal | 30/319 X |
| 1,073,592 | 9/1913 | Contenti | 30/365 |
| 1,574,819 | 3/1926 | Jezler | 30/319 X |
| 3,346,956 | 10/1967 | Wezel et al. | 30/355 X |
| 3,353,526 | 11/1967 | Daem et al. | 30/355 X |
| 3,358,370 | 12/1967 | Logan | 30/355 X |
| 3,756,482 | 9/1973 | DeTorre | 225/2 |
| 3,800,991 | 4/1974 | Grove et al. | 225/2 |
| 3,865,293 | 2/1975 | Ernsberger et al. | 225/2 |
| 3,865,673 | 2/1975 | DeTorre | 225/2 X |
| 4,423,836 | 1/1984 | Hyatt | 83/886 X |
| 4,738,028 | 4/1988 | Belokin et al. | 30/319 |
| 4,891,885 | 1/1990 | Fischer et al. | 30/355 |
| 5,144,749 | 9/1992 | Chen | 30/319 |

FOREIGN PATENT DOCUMENTS

| 54-180463 | of 1979 | Japan . | |
| 62-23780 | 6/1987 | Japan . | |
| 4-224128 | 8/1992 | Japan . | |
| 5-254865 | 10/1993 | Japan . | |
| 6-56451 | 3/1994 | Japan . | |
| 518286 | 7/1976 | U.S.S.R. | 225/103 |
| 7536 | of 1885 | United Kingdom | 30/365 |

*Primary Examiner*—Clark F. Dexter
*Attorney, Agent, or Firm*—Wenderoth, Lind & Ponack, L.L.P.

[57]                ABSTRACT

A glass cutting disc forms a scribed line on a surface of a glass product along which the glass product can be broken when an external force is applied thereto. The glass cutting disc includes an outer peripheral portion radially outwardly beveled to define a peripheral ridge. The peripheral ridge has surface features formed thereon so as to alternate in a direction circumferentially of the cutting disc. The surface features may be in the form of protrusions and grooves that alternate with each other over the peripheral ridge.

36 Claims, 7 Drawing Sheets

GLASS SCRIBING DISC

This application is a continuation of now abandoned application Ser. No. 08/611,192, filed Mar. 5, 1996, now abandoned.

BACKGROUND OF THE INVENTION

1. Field of the Invention

The present invention generally relates to a glass cutter and, more particularly, to a glass cutting disc for forming a scribed line on glass products such as flatware, for example, window glass and plate glass, and container ware, for example, bottles and jars.

2. Description of the Prior Art

The scribed line formed on, for example, a glass plate is known as a line mark along which the glass plate breaks when an external force is applied to such glass plate. In old times, diamond has been used to draw the scribed line on glass products. However, a disc of hard alloy such as, for example, tungsten carbide, or sintered diamond has come to be largely used in forming the scribed line.

The Japanese Laid-open Utility Model Publication No. 54-180463 published in 1979 discloses a glass cutting disc made of steel and having a diameter ranging from a few millimeters to about ten millimeters. The cutting disc is supported by a handle through a spindle for rotation about the spindle so that when the handle is drawn in one direction with the cutting disc pressed against the plate glass, the cutting disc rotates along a surface of the plate glass leaving a scribed line.

According to the above mentioned publication, as shown in FIG. 21 of the accompanying drawing, the cutting disc identified by 1 has its outer peripheral portion substantially bevelled so as to terminate at a flat ridge Q which is roughened to provide surface irregularities. The surface irregularities on the flat ridge Q of the known glass cutting disc serve to minimize any possible slip of the cutting disc relative to the plate glass to thereby ensure a scribed line on the glass plate.

In the prior art glass cutting disc discussed above, since to provide the surface roughened flat ridge Q in the cutting disc a sharp ridge once formed by bevelling the outer peripheral portion of the cutting disc is ground, the scribing performance exhibited by the prior art glass cutting disc appears to be sacrificed substantially.

A glass cutting disc disclosed in Japanese Laid-open Patent Publication No. 6-56451 published Mar. 1, 1994, appears to be successful in overcoming the problem inherent in the glass cutting disc disclosed in the first-mentioned publication. The glass cutting disc according to the second-mentioned publication is reproduced in FIGS. 22 and 23 of the accompanying drawings in diagrammatic side and front elevational representations, respectively.

Referring to FIGS. 22 and 23, the prior art glass cutting disc shown therein has its outer peripheral portion bevelled to define opposite inclined annular faces 2 that converge radially outwardly at a point lying on a sharp peripheral ridge. The opposite inclined annular faces 2 are ground to have surface irregularities 3.

In either case, the surface irregularities employed in any one of the foregoing glass cutting discs are intended to minimize any possible slip of the cutting disc relative to the plate glass and in no way satisfy the following requirements for the scribing performance.

a) The plate glass can be broken accurately along the scribed line, b) A breaking force to be applied to the cutting disc to form the scribed line is small, and c) Unnecessary chipping is minimized at cut edges when the plate glass is broken along the scribed line.

SUMMARY OF THE INVENTION

The present invention is therefore intended to provide an improved glass cutting or scribing disc effective not only to minimize any possible slip of the cutting disc relative to a glass product to be cut, but also to satisfy the above requirements for scribing performance.

In order to accomplish the foregoing objects, the present invention provides a glass cutting disc for forming a scribed line on a surface of a glass product along which the glass product can be broken when an external force is applied thereto. The glass cutting disc having a predetermined outer diameter, which may be within the range of 1 to 20 mm, and a predetermined thickness, which may be within the range of 0.6 to 5 mm, includes an outer peripheral portion radially outwardly beveled at a predetermined angle of convergence, which may be within the range of 90° to 160°, to define a peripheral ridge. The peripheral ridge has surface features formed thereon so as to alternate in a direction circumferentially of the cutting disc. The surface features may be in the form of protrusions and grooves that alternate with each other over the peripheral ridge.

Preferably, the protrusions have a predetermined height as measured from the base of the respective groove to the peripheral ridge, which may be within the range of 2 to 20 $\mu$m, but variable with the particular outer diameter of the cutting disc, and are spaced over the peripheral ridge a predetermined pitch which may be within the range of 20 to 200 $\mu$m, but variable depending on the particular outer diameter of the cutting disc.

Where the grooves are in the form of generally U-shaped grooves each having a rounded bottom, the radius of curvature of each groove is preferably within the range of 0.02 to 1.0 mm.

The glass cutting disc of the present invention can exhibit its, maximum scribing performance when drawn along a surface of the glass product at a scribing speed within the range of 50 to 1,000 mm/sec under a scribing load of 1.0 to 60 Kgf which is variable depending on the particular outer diameter of the cutting disc. In practice, however, a relatively low scribing load may be employed when a plate glass to be scribed has a relatively small thickness and/or when the angle of convergence is relatively small, for example, about 100°.

BRIEF DESCRIPTION OF THE DRAWINGS

The above and other objects and features of the present invention will become clear from the following description taken in conjunction with preferred embodiments thereof with reference to the accompanying drawings, in which like parts are designated by like reference numerals and in which.

DETAILED DESCRIPTION OF THE EMBODIMENTS

Figure 1:
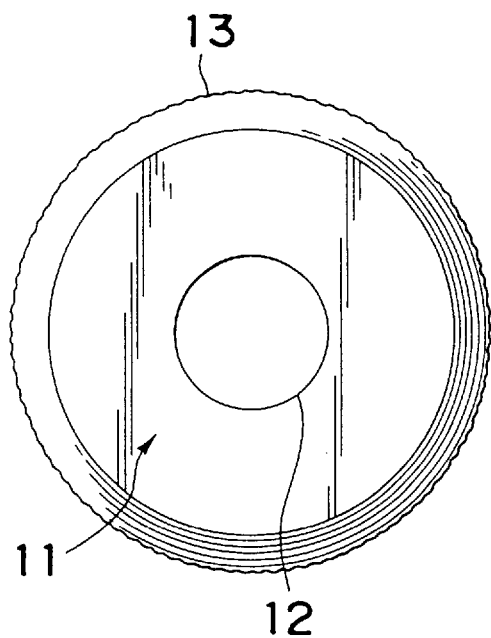
FIG. 1 is an exaggerated side view of a glass cutting or scribing disc according to a first preferred embodiment of the present invention.
Figure 2:
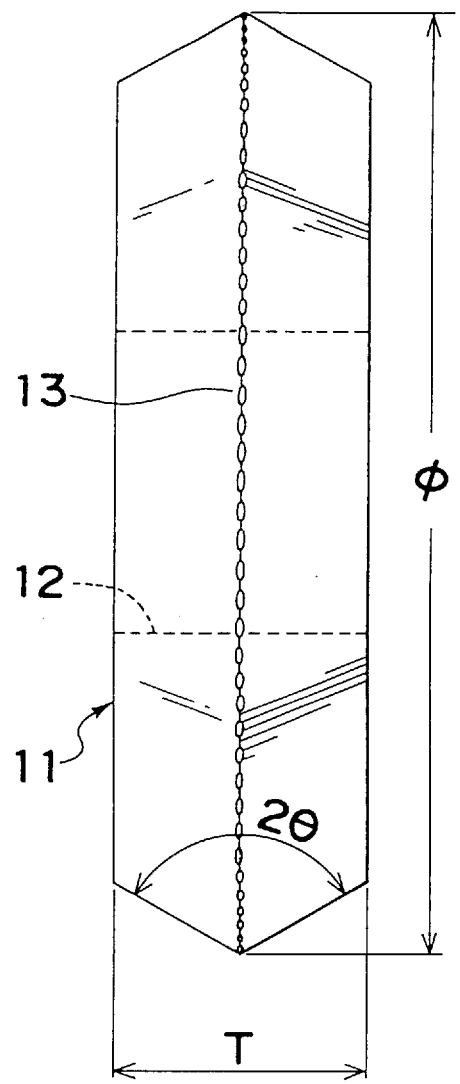
FIG. 2 is an exaggerated front elevational view, on an enlarged scale, of the glass cutting disc shown in FIG. 1.
Figure 3:
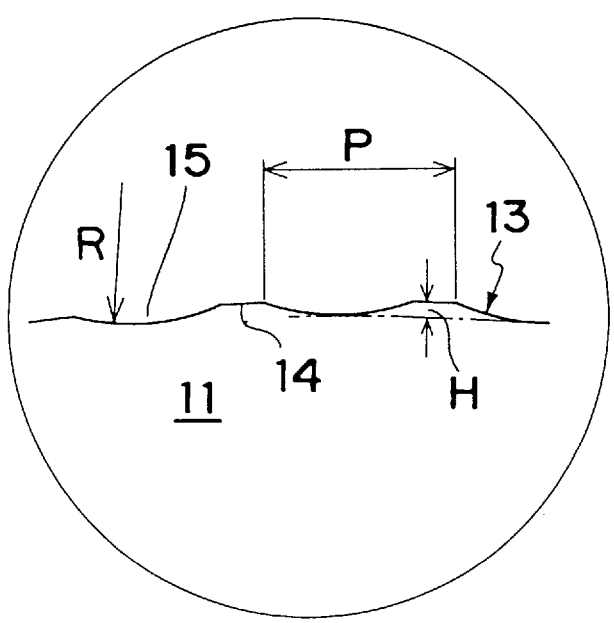
FIG. 3 is a schematic micrographic representation of a portion of the peripheral ridge of the glass cutting disc shown in FIG. 1.

Referring first to FIGS. 1 to 3, a glass cutting disc 11 according to a first preferred embodiment of the present invention is of a round configuration having a predetermined thickness T and a predetermined maximum diameter $\phi$. The cutting disc 11 has a center hole 12 defined therein for receiving therethrough a support spindle (not shown). Opposite outer peripheral edge portions of the cutting disc 11 are radially outwardly bevelled so as to converge at a predetermined angle $2\theta$ to thereby form a substantially sharp peripheral ridge 13.

As best shown in FIGS. 2 and 3, the peripheral ridge 13 of the cutting disc 11 is formed with regular surface features which are, in the instance as shown, in the form of generally trapezoidal protrusions 14 and generally U-shaped recessor grooves 15 that alternate with each other over the circumference of the cutting disc 11. The trapezoidal protrusions 14 have a height H, as measured from the base of each U-shaped groove 15 to a point on the peripheral ridge 13 in a direction radially of the cutting disc 11, with each pair of neighboring trapezoidal protrusions 14 being spaced a predetermined pitch P circumferentially of the cutting disc 11.

Figure 15:
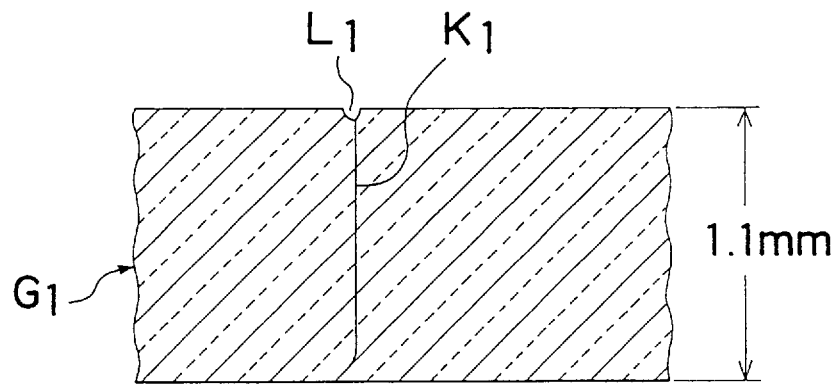
FIG. 15 is a fragmentary sectional view of a plate glass having a scribed line formed thereon by the use of the glass cutting disc of the present invention.

FIG. 15 illustrates a fragmentary sectional view of a plate glass $G_1$ of 1.1 mm in thickness having a scribed line $L_1$ formed thereon by the use of the glass cutting disc 11 shown in FIGS. 1 to 3 and having the following particulars:

Disc Diameter $\phi$: 2.5 mm
Disc Thickness T: 0.65 mm
Convergent Angle $2\theta$: 125°
Number of Protrusions 14: 125
Protrusion Height H: 5 $\mu$m, and
Pitch P: 63 $\mu$m.

The cutting disc 11 of the above particulars was drawn along an intended line on an upper surface of the plate glass $G_1$ at a scribing speed of 300 mm/sec under a load of 3.6 Kgf as measured at the point of contact of the peripheral ridge 13 of the cutting disc 11 with the upper surface of the plate glass $G_1$.

As shown in FIG. 15, the plate glass $G_1$ has an upper surface formed with the scribed line $L_1$ represented by a line of a scratch left thereon by moving the cutting disc 11 in rotational contact with such upper surface. As the cutting disc 11 was drawn along an intended line on the upper surface of the plate glass $G_1$, cracking took place as indicated by $K_1$, having run deep in a direction of the thickness of the plate glass $G_1$. Micrographic examination has shown that the crack $K_1$ ran or extended a distance of 962 $\mu$m deep into the thickness of the glass plate $G_1$.

Figure 16:
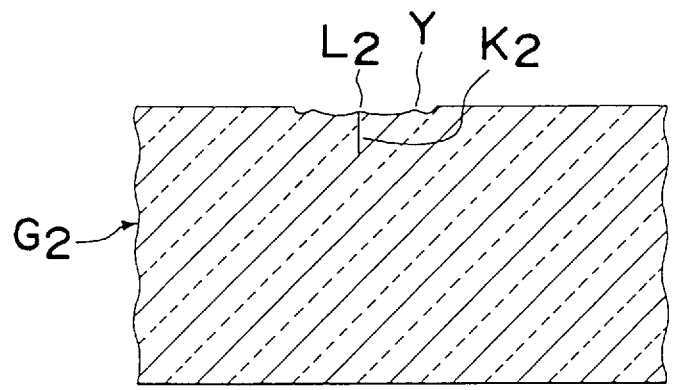
FIG. 16 is a view similar to FIG. 15, showing the scribed line formed by the use of the prior art glass cutting disc.

On the other hand, FIG. 16 illustrates a fragmentary sectional view of a plate glass $G_2$ of 1.1 mm in thickness having a scribed line $L_2$ formed thereon by the use of the prior art glass cutting disc of the same dimensions as those of the cutting disc 11, but having no surface feature and operated under the same scribing conditions as those discussed above. As shown therein, the scribed line $L_2$ resulted in formation of crack $K_2$ that ran into the thickness of the glass plate $G_2$ a smaller distance, say, 130 $\mu$m, than that accomplished by the use of the cutting disc 11 of the present invention. In addition, as clearly depicted in FIG. 16, formation of the line of scratch representing the scribed line $L_2$ was accompanied by chipping occurring at Y on the upper surface of the plate glass $G_2$ in opposite directions perpendicular to the direction of thickness of the plate glass $G_2$.

Thus, where the crack does not run a sufficient distance deep into the thickness of the glass plate such as exhibited in the plate glass $G_2$ of FIG. 16, a relatively large breaking force is required to break the glass plate along the scribed line during the subsequent breaking step. Also, with the prior art cutting disc, growth of the crack resulting from formation of the scribed line is instable to such an extent as to fail to provide the crack running into the thickness of the plate glass a distance sufficient to facilitate a quick and easy breaking of the plate glass. Formation of the chipping Y may result in not only reduction in surface quality of broken pieces of the plate glass, but also failure of the plate glass to be broken accurately along the scribed line.

Figure 17:
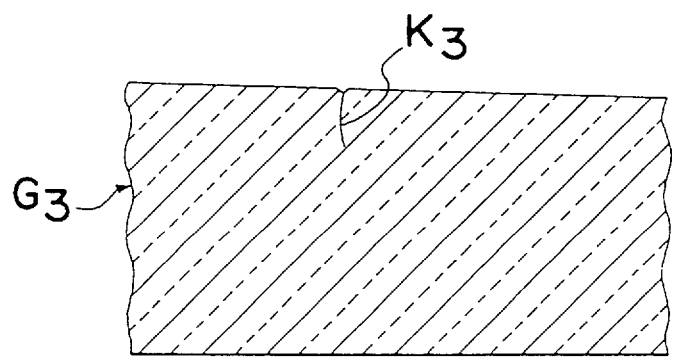
FIG. 17 is a view similar to FIG. 15, showing the scribed line formed by the use of the prior art glass cutting disc with application of a recommended load thereto.

It has been found that when the load applied during the scribing operation to the prior art cutting disc which resulted in formation of the chipping Y as shown in FIG. 16 was reduced to a recommended load of 1.4 Kgf, no chipping occurred as shown in FIG. 17. However, although no chipping occurred as shown in FIG. 17, microscopic examination of the plate glass $G_3$ shown in FIG. 17 has shown that the resultant crack $K_3$ did not run a sufficient distance deep into the thickness of the plate glass $G_3$, but was of a depth corresponding to that shown in FIG. 16.

Thus, FIGS. 16 and 17 suggest that the use of the prior art cutting disc does not result in formation of a crack that runs a sufficient depth into the thickness of the plate glass, but results in formation of chips when the load applied to the prior art cutting disc during the scribing operation is increased to a value higher than the recommended load.

With the cutting disc according to the present invention, however, substantially no chipping occurs and a crack that runs into the thickness of the plate glass a depth generally proportional to the applied load can be obtained. The greater the depth over which the crack runs in the thickness of the plate glass, the easier will be breakage of the plate glass along the scribed line, and therefore, the yield of the glass products can be increased. In addition, considering that breakage of the plate glass along the scribed line is easy to accomplish, the breaking step can advantageously be simplified or dispensed with.

Figure 4:
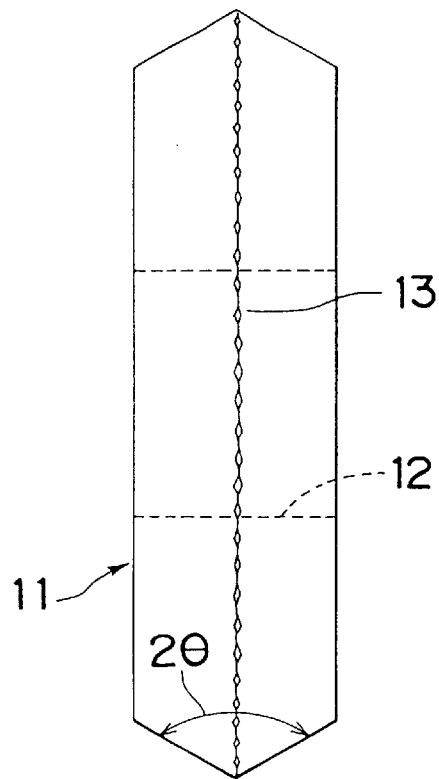
FIG. 4 is an exaggerated front elevational view of the glass cutting disc according to a second preferred embodiment of the present invention.
Figure 5:
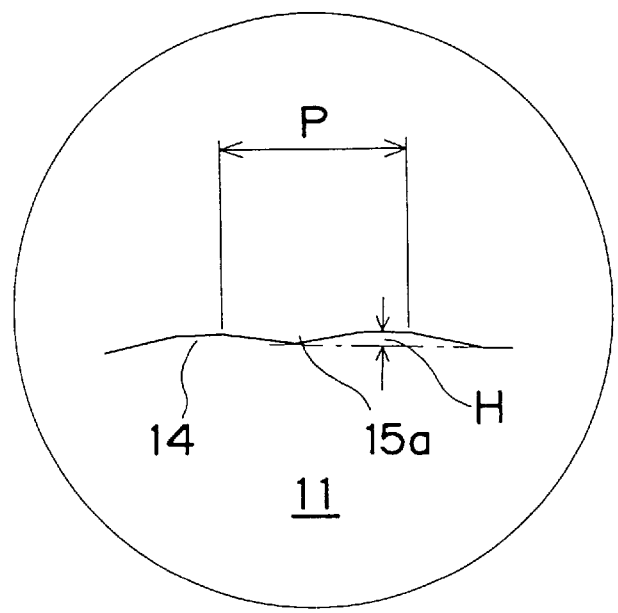
FIG. 5 is a schematic micrographic representation of a portion of the peripheral ridge of the glass cutting disc shown in FIG. 4.

FIGS. 4 and 5 illustrate a second preferred embodiment of the present invention. In this embodiment, the surface features at the peripheral ridge 13 of the cutting disc 11 are in the form of generally trapezoidal protrusions 14 and generally V-shaped grooves 15a that alternate with each other in a direction circumferentially of the cutting disc 11.

Figure 7:
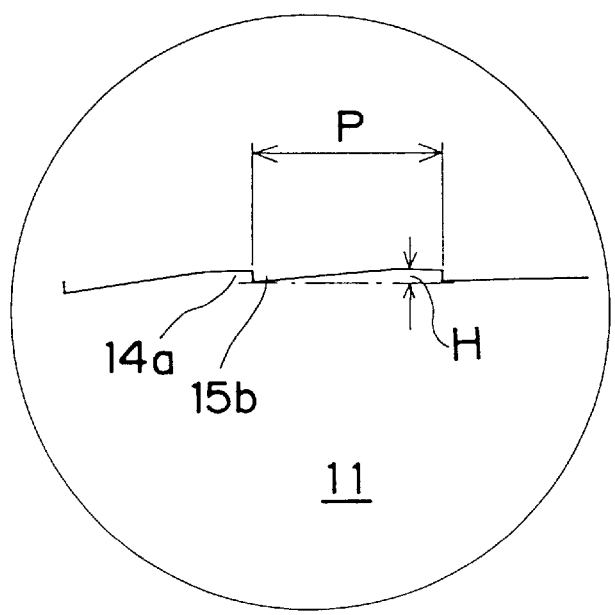
FIGS. 6 and 7 are views similar to FIGS. 4 and 5, respectively, showing a third preferred embodiment of the present invention.
Figure 6:
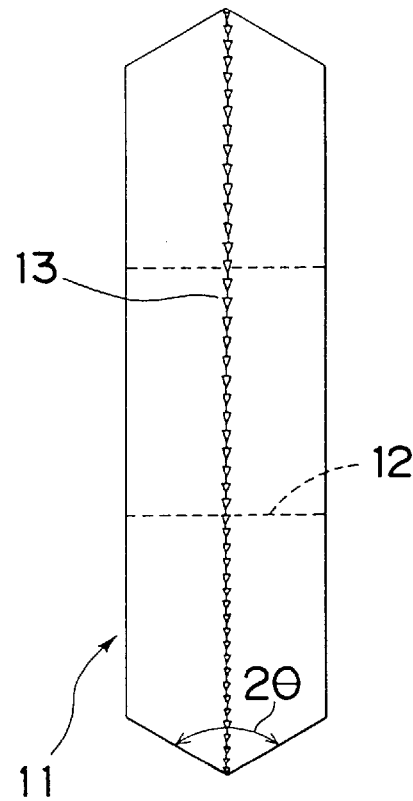

FIGS. 6 and 7 illustrate a third preferred embodiment of the present invention, in which the surface features at the peripheral ridge 13 of the cutting disc 11 are in the form of generally triangular protrusions 14a and generally sawtooth-shaped grooves 15b that alternate with each other in a direction circumferentially of the cutting disc 11.

Figure 8:
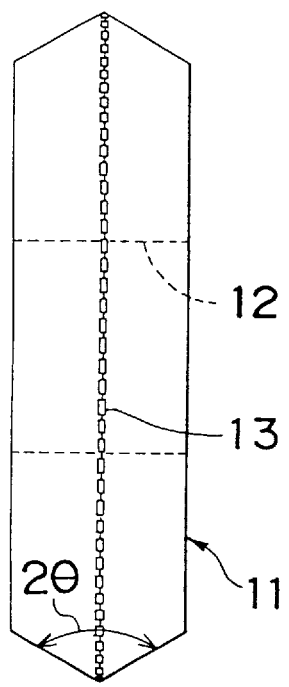
FIGS. 8 and 9 are views similar to FIGS. 4 and 5, respectively, showing a fourth preferred embodiment of the present invention.
Figure 9:
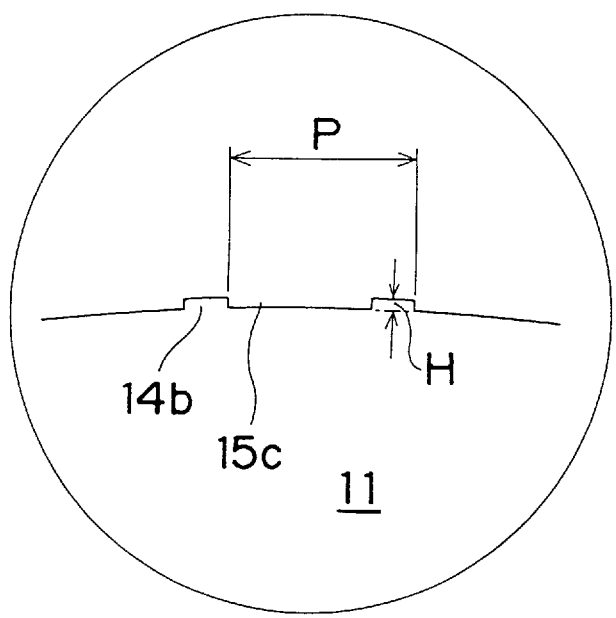

FIGS. 8 and 9 illustrate a fourth preferred embodiment of the present invention, in which the surface features at the peripheral ridge 13 of the cutting disc 11 are in the form of generally rectangular protrusion 14b and generally rectangular grooves 15c that alternate with each other in a direction circumferentially of the cutting disc 11.

Figure 10:
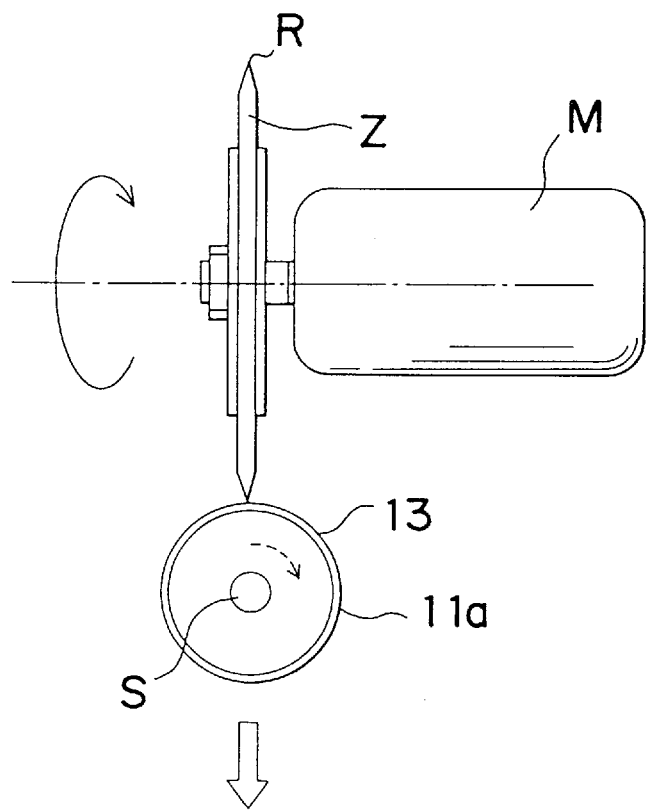
FIG. 10 is a schematic diagram showing an apparatus which may be used to form regular surface features on the peripheral ridge of the glass cutting disc in accordance with the teachings of the present invention.
Figure 11:
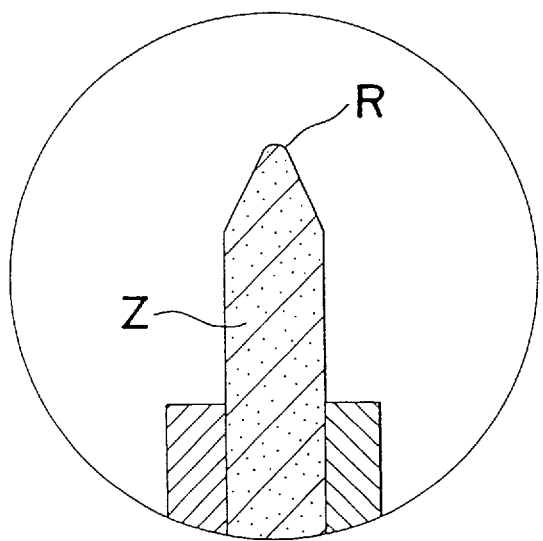
FIGS. 11 to 14 are exaggerated diagrams showing different shapes of peripheral edges of grinding wheels used to form the various surface features in accordance with the teachings of the present invention.
Figure 12:
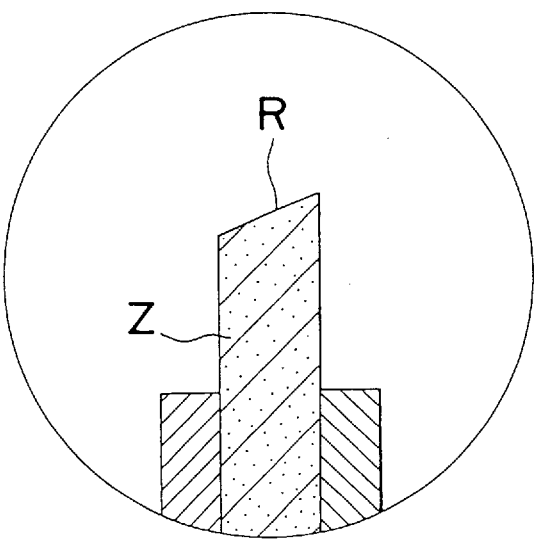
Figure 13:
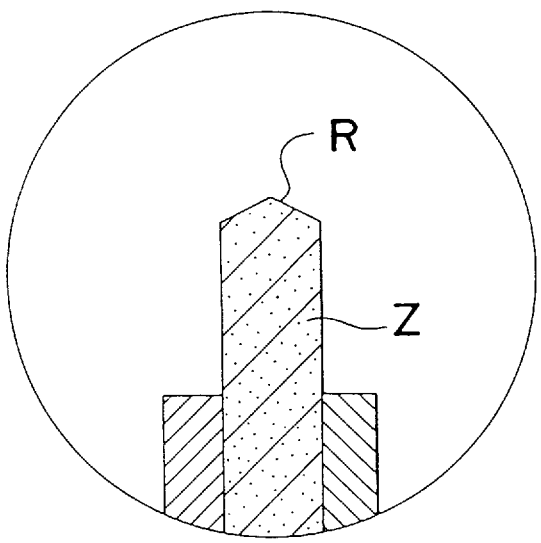
Figure 14:
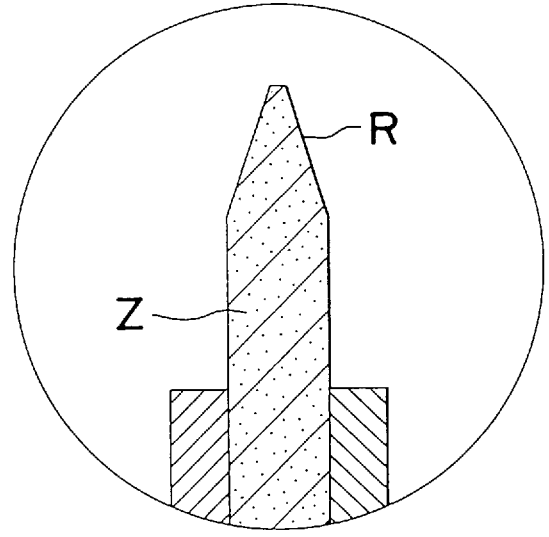

FIG. 10 illustrates a grinding machine used to form the surface feature at the peripheral ridge 13 of the cutting disc 11 in accordance with the teachings of the present invention. The grinding machine includes a drive motor M having a drive shaft on which a disc-shaped whetstone or abrasive cutting wheel Z is mounted for rotation together therewith. A disc 11a which eventually forms the cutting disc 11 is mounted on a spindle S for rotation together therewith and positioned below the disc-shaped whetstone Z so as to lie perpendicular to the drive shaft of the drive motor M. The spindle S may be coupled with a stepper motor for driving the spindle S intermittently and is supported for movement between a grinding position, as shown, in which the peripheral ridge 13 of the disc 11a is brought into grinding engagement with an outer peripheral ridge R of the whetstone Z, and a retracted position in which the peripheral ridge 13 of the disc 11a is separated from the outer peripheral ridge R of the whetstone Z.

Thus, the grinding machine is so structured and so configured that each time one surface feature is formed at the peripheral ridge 13 of the disc 11a, the spindle S carrying the disc 11 can be moved from the grinding position to the retracted position and is then rotated intermittently an angular distance corresponding to the pitch P to bring a portion of the peripheral ridge 13, where the next succeeding surface feature is to be formed, into alignment with the peripheral ridge of the whetstone Z, followed by movement of the spindle S from the retracted position to the grinding position.

The outer peripheral ridge R of the whetstone Z should have a shape required to shape the particular surface features at the peripheral ridge 13 of the disc 11a. By way of example, where the surface features shown in FIGS. 3, 5, 7 and 9 are desired to be formed, whetstones having the peripheral ridges P shaped as shown in FIGS. 11, 12, 13 and 14 should be used, respectively.

Even the cutting disc 11 according to any one of the second to fourth preferred embodiments of the present invention can work in a manner similar to and bring about effects similar to those brought about by the cutting disc according to the first embodiment of the present invention, provided that they satisfy the above discussed conditions (pitch P and height H).

Where the cutting disc has an extremely small diameter, the use of an electrical discharge machining apparatus is preferred partly because grinding to form the surface features should be carried out in the order of micron and partly because the disc to be formed with the surface features is extremely hard. While the use of the above discussed grinding machine is limited to grinding in a direction perpendicular to the cutting wheel Z, the use of the electrical discharge machining apparatus is effective to provide a glass cutting disc having any desired surface features at the outer peripheral ridge thereof that satisfy the high scribing performance, without being accompanied by production of scraps.

Figure 18:
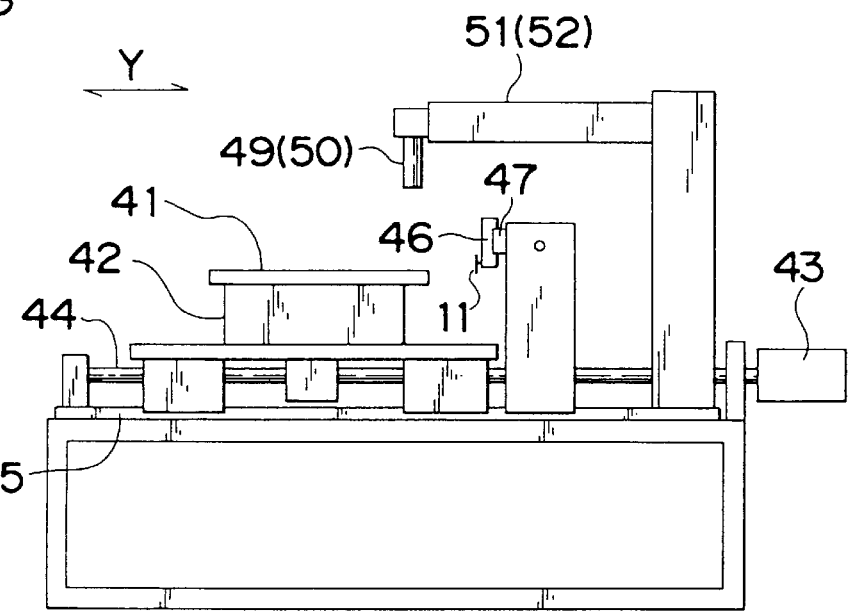
FIG. 18 is a schematic front elevational view showing an automatic glass scribing machine.
Figure 20:
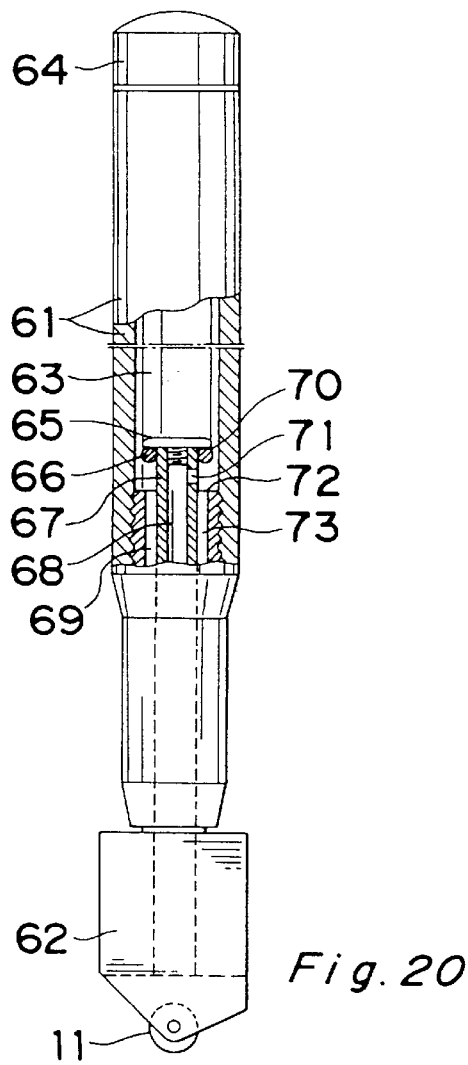
FIG. 20 is a front elevational view, with a portion cut away, of a hand-held glass cutter using the glass cutting disc of the present invention.
Figure 19:
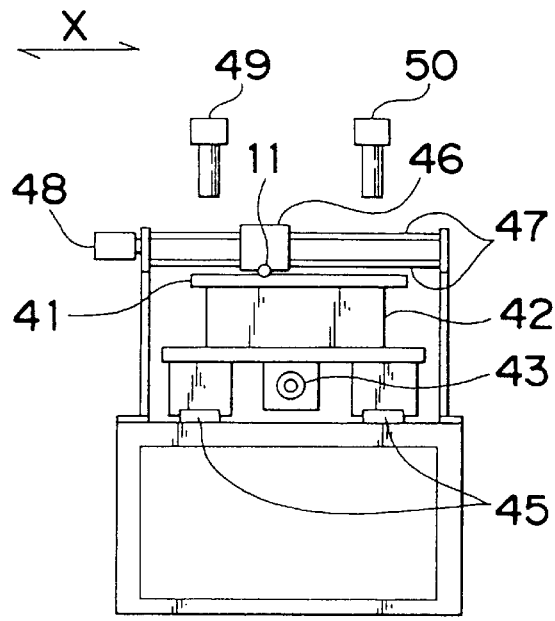
FIG. 19 is a side view of the automatic glass scribing machine shown in FIG. 18.
Figure 21:
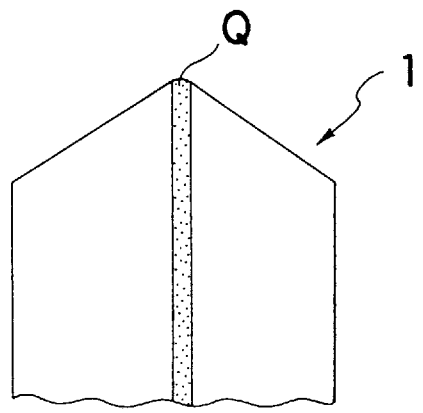
FIG. 21 is a fragmentary front elevational view of a peripheral ridge of a prior art glass cutting disc.
Figure 22:
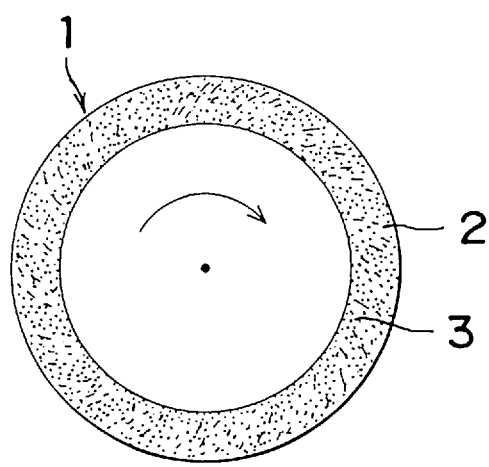
FIGS. 22 and 23 are schematic side and front elevational views of a different prior art glass cutting disc, respectively.
Figure 23:
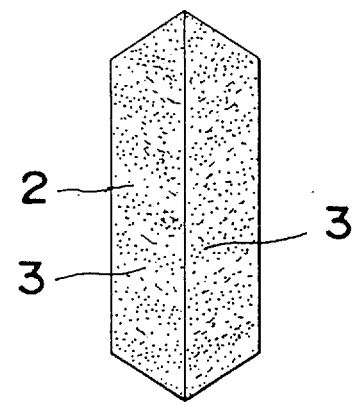

The glass cutting disc 11 of the present invention is conveniently employed in an automatic glass scribing machine shown in FIGS. 18 and 19 or a hand-held glass cutting tool shown in FIG. 20.

Referring to FIGS. 18 and 19, the automatic glass scribing machine shown therein comprises a support table 41 for the support thereon of a plate glass to be scribed. The support table 41 is mounted on a rotary table 42 for rotation together therewith in a horizontal plane, which is in turn mounted on a ball-and-screw mechanism 44 for movement in a direction shown by the arrow Y. The machine also comprises a cutter head 46 having the glass cutting disc 11 rotatably mounted on a lower end thereof, which head 46 is supported for movement along a horizontal rail 47 in a direction shown by the arrow X which is perpendicular to the direction Y.

During the scribing operation, each time the table 41 is intermittently moved in the direction Y a predetermined pitch, the cutter head 46 is driven in the direction X to form the scribed line extending in a direction parallel to the direction X. If the table 41 is then rotated 90° and the cutter head 46 is driven in the direction X, the scribed line extending in a direction parallel to the direction Y can be formed on the surface of the plate glass.

The automatic glass scribing machine shown in and described with reference to FIGS. 18 and 19 is only for the purpose of illustration and the glass cutting disc 11 according to the present invention can be utilized in any other scribing machine of a kind wherein a table 41 is supported for movement in both directions perpendicular to each other, or wherein while the table 41 is fixed in position, the cutter head 46 is supported for movement in both directions perpendicular to each other.

The hand-held glass cutting tool shown in FIG. 20 is of a type disclosed in the Japanese Utility Model Publication No. 62-23789, published in 1987, in which in place of the conventional glass cutting disc the glass cutting disc 11 of the present invention is rotatably mounted. The glass cutting tool shown therein includes a generally cylindrical grip 61, a cutter head 62 secured to a lower end of the grip 61 and carrying the cutting disc 11. The cylindrical grip 61 accommodates therein an oil reservoir 63 for supplying a lubricant oil for oiling the cutting disc 11, a cap 64 for tightly closing a supply port leading to the oil reservoir 63 and other accessory parts 65 to 73 which are not herein discussed in detail since the hand held glass cutting tool as well as the related component parts are not subject matter of the present invention.

Summarizing the foregoing, the present invention may be practiced satisfactorily if the glass cutting disc 11 having the following dimensions and also having the surface features of the following size is employed.

Disc Diameter φ: 1 to 20 mm

Disc Thickness T: 0.6 to 5 mm

Convergent Angle 2θ: 90° to 160°

Pitch P: 20 to 200 μm variable depending on the disc diameter φ.

Protrusion Height H: 2 to 20 μm variable depending on the disc diameter φ.

Radius of Curvature R: 0.02 to 1.0 mm applicable only to the embodiment of FIGS. 1 to 3.

Scribing Load: 1.0 to 60 Kgf variable depending on the disc diameter φ.

Scribing Speed: 50 to 1,000 mm/sec.

It is to be noted that the prior art glass cutting disc is operable under a load within the range of 1.0 to 40 Kgf. It is also to be noted that while the load under which the cutting disc of the present invention is operable is variable in proportion to the diameter φ of the cutting disc 11, a relatively low load may be employed when the plate glass has a relatively small thickness and/or when the angle 2θ of convergence is relatively small, for example, about 100°.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A glass scribing disc for defining, when rotated about a center of said disc, a scribed line on a plate glass represented by cracks running generally halfway across the thickness of the plate glass to facilitate breakage of the plate glass into pieces along such scribed line, said glass scribing disc comprising:

a round flat body having a thickness within a range of 0.6 to 5 mm and having a diameter within a range of 1 to 20 mm;

said round flat body having opposite first and second round surfaces and first and second outer peripheral surfaces extending from respective said first and second round surfaces to converge at an angle within a range of 90° to 160° to thereby define a peripheral scribing edge;

said peripheral scribing edge having defined therein a series of circumferentially alternating grooves and protrusions; and each of said protrusions having a radial height within a range of 2 to 20 μm as measured in a direction radially outwardly of said round flat body from a base of adjacent grooves, each pair of adjacent protrusions being spaced from each other in a direction circumferentially of said round flat body by a pitch of 20 to 200 μm.

2. The glass scribing disc as claimed in claim 1, wherein each of said grooves has a radially inwardly curved bottom having a radius of curvature within a range of 0.02 to 1.0 mm.

3. An automatic glass scribing machine comprising:

a table means for supporting thereon a plate glass to be scribed along an intended line, said table means being movable in either one of two directions perpendicular to each other; and a cutter head movably supported above said table means and including a glass scribing disc for defining on the plate glass when said cutter head is moved along the intended line above and in rolling contact with the plate glass a scribed line represented by cracks running generally halfway across the thickness of the plate glass to facilitate breakage of the plate glass into pieces along such scribed line, said glass scribing disc comprising:

a round flat body having a thickness within a range of 0.6 to 5 mm and having a diameter within the range of 1 to 20 mm;

said round flat body having opposite first and second round surfaces and first and second outer peripheral surfaces extending from respective said first and second round surfaces to converge at an angle within a range of 90° to 160° to thereby define a peripheral scribing edge;

said peripheral scribing edge having defined therein a series of circumferentially alternating grooves and protrusions; and each of said protrusions having a radial height within a range of 2 to 20 μm as measured in a direction radially outwardly of said round flat body from a base of adjacent grooves, each pair of adjacent protrusions being spaced from each other in a direction circumferentially of said round flat body by a pitch of 20 to 200 μm.

4. A machine as claimed in claim 3, wherein each of said grooves has a radially inwardly curved bottom having a radius of curvature within a range of 0.02 to 1.0 mm.

5. A glass scribing tool comprising:

a generally elongated handle having first and second ends opposite to each other; and a glass scribing disc rotatably mounted on one of said first and second ends of said handle for defining on a plate glass when said handle is moved along an intended line above the plate glass with said disc held in rolling contact with the plate glass a scribed line represented by cracks running generally halfway across the thickness of the plate glass to facilitate breakage of the plate glass into pieces along such scribed line, said glass scribing disc comprising:

a round flat body having a thickness within a range of 0.6 to 5 mm and having a diameter within a range of 1 to 20 mm;

said round flat body further having opposite first and second round surfaces and first and second outer peripheral surfaces extending from respective said first and second round surfaces to converge at an angle within a range of 90° to 160° to thereby define a peripheral scribing edge;

said peripheral scribing edge having defined therein a series of circumferentially alternating grooves and protrusions; and each of said protrusions having a radial height within a range of 2 to 20 μm as measured in a direction radially outwardly of said round flat body from a base of adjacent grooves, each pair of adjacent protrusions being spaced from each other in a direction circumferentially of said round flat body by a pitch of 20 to 200 μm.

6. A tool as claimed in claim 5, wherein each of said grooves has a radially inwardly curved bottom having a radius of curvature within a range of 0.02 to 1.0 mm.

7. A glass scribing disc for forming a scribed line on a brittle plate by generating vertical cracks due to brittle fracture thereof, said glass scribing disc comprising:

a peripheral portion defined by first and second circumferentially extending beveled surfaces that converge radially outwardly and that define therebetween an obtuse angle, that intersect at a circumferential line extending along a radially outermost portion of said disc and that form a circumferentially extending ridge;

said ridge including circumferentially alternately arranged first portions and second portions;

each said first portion including a radial protrusion defined by said first and second beveled surfaces and having an arc-shaped cutting edge extending along said circumferential line; and each said second portion comprising a recess extending radially inwardly from said circumferential line to a depth of from 2 to 20 μm.

8. A glass scribing disc as claimed in claim 7, wherein each said recess has a radially inwardly curved bottom.

9. A glass scribing disc as claimed in claim 8, wherein said bottom is curved at a radius of curvature of from 0.02 to 1.0 mm.

10. A glass scribing disc as claimed in claim 7, wherein each said recess is V-shaped.

11. A glass scribing disc as claimed in claim 7, wherein each said recess has a sawtooth shape.

12. A glass scribing disc as claimed in claim 7, wherein each said recess has a substantially rectangular shape.

13. A glass scribing disc as claimed in claim 7, wherein said first portions are arranged circumferentially at a pitch, equal to a sum of a circumferential length, each arc-shaped cutting edge and a circumferential length of an adjacent recess, of from 20 to 200 μm.

14. A glass scribing disc as claimed in claim 13, having a diameter of from 1 to 20 mm.

15. A glass scribing disc as claimed in claim 7, having a diameter of from 1 to 20 mm.

16. A glass scribing disc as claimed in claim 7, wherein said angle is from more than 90° to 160°.

17. An automatic glass scribing machine comprising:

a table for supporting thereon a brittle plate to be scribed;

a cutter head provided at a position above said table;

at least one of said cutter head and said table being supported by means for creating relative movement therebetween in a direction parallel to a support surface of said table; and a glass scribing disc supported by said cutter head for, upon said relative movement, forming a scribed line on the brittle plate by generating vertical cracks due to brittle fracture thereof, said glass scribing disc comprising:

a peripheral portion defined by first and second circumferentially extending beveled surfaces that converge radially outwardly and that define therebetween an obtuse angle, that intersect at a circumferential line extending along a radially outermost portion of said disc and that form a circumferentially extending ridge;

said ridge including circumferentially alternately arranged first portions and second portions;

each said first portion including a radial protrusion defined by said first and second beveled surfaces and having an arc-shaped cutting edge extending along said circumferential line; and each said second portion comprising a recess extending radially inwardly from said circumferential line to a depth of from 2 to 20 μm.

18. An automatic glass scribing machine as claimed in claim 17, wherein each said recess has a radially inwardly curved bottom.

19. An automatic glass scribing machine as claimed in claim 18, wherein said bottom is curved at a radius of curvature of from 0.02 to 1.0 mm.

20. An automatic glass scribing machine as claimed in claim 17, wherein each said recess is V-shaped.

21. An automatic glass scribing machine as claimed in claim 17, wherein each said recess has a sawtooth shape.

22. An automatic glass scribing machine as claimed in claim 17, wherein each said recess has a substantially rectangular shape.

23. An automatic glass scribing machine as claimed in claim 17, wherein said first portions are arranged circumferentially at a pitch, equal to a sum of a circumferential length each arc-shaped cutting edge and a circumferential length of an adjacent recess, of from 20 to 200 μm.

24. An automatic glass scribing machine as claimed in claim 23, having a diameter of from 1 to 20 mm.

25. An automatic glass scribing machine as claimed in claim 17, having a diameter of from 1 to 20 mm.

26. An automatic glass scribing machine as claimed in claim 17, wherein said angle is from 90° to 160°.

27. A glass scribing tool comprising:

an elongated handle having opposite first and second ends; and a glass scribing disc, rotatably mounted on one of said first and second ends of said handle, for forming a scribed line on a brittle plate by generating vertical cracks due to brittle fracture thereof, said glass scribing disc comprising:

a peripheral portion defined by first and second circumferentially extending beveled surfaces that converge radially outwardly and that define therebetween an obtuse angle, that intersect at a circumferential line extending along a radially outermost portion of said disc and that form a circumferentially extending ridge;

said ridge including circumferentially alternately arranged first portions and second portions;

each said first portion including a radial protrusion defined by said first and second beveled surfaces and having an arc-shaped cutting edge extending along said circumferential line; and each said second portion comprising a recess extending radially inwardly from said circumferential line to a depth of from 2 to 20 μm.

28. A glass scribing tool as claimed in claim 27, wherein each said recess has a radially inwardly curved bottom.

29. A glass scribing tool as claimed in claim 28, wherein said bottom is curved at a radius of curvature of from 0.02 to 1.0 mm.

30. A glass scribing tool as claimed in claim 27, wherein each said recess is V-shaped.

31. A glass scribing tool as claimed in claim 27, wherein each said recess has a sawtooth shape.

32. A glass scribing tool as claimed in claim 27, wherein each said recess has a substantially rectangular shape.

33. A glass scribing tool as claimed in claim 27, wherein said first portions are arranged circumferentially at a pitch, equal to a sum of a circumferential length each arc-shaped cutting edge and a circumferential length of an adjacent recess, of from 20 to 200 μm.

34. A glass scribing tool as claimed in claim 33, having a diameter of from 1 to 20 mm.

35. A glass scribing tool as claimed in claim 27, having a diameter of from 1 to 20 mm.

36. A glass scribing tool as claimed in claim 27, wherein said angle is from 90° to 160°.

* * * * *